June 26, 1951 A. W. ALBRECHT ET AL 2,558,474

RECORD CHANGER

Filed Nov. 14, 1947 4 Sheets-Sheet 1

INVENTORS
ALBERT W. ALBRECHT, EDW. J. MASTNEY
ARTHUR C. TEN CATE
BY
Robert L Kahn RECORD CHANGER
Filed Nov. 14, 1947 4 Sheets-Sheet 2
Fig. 3
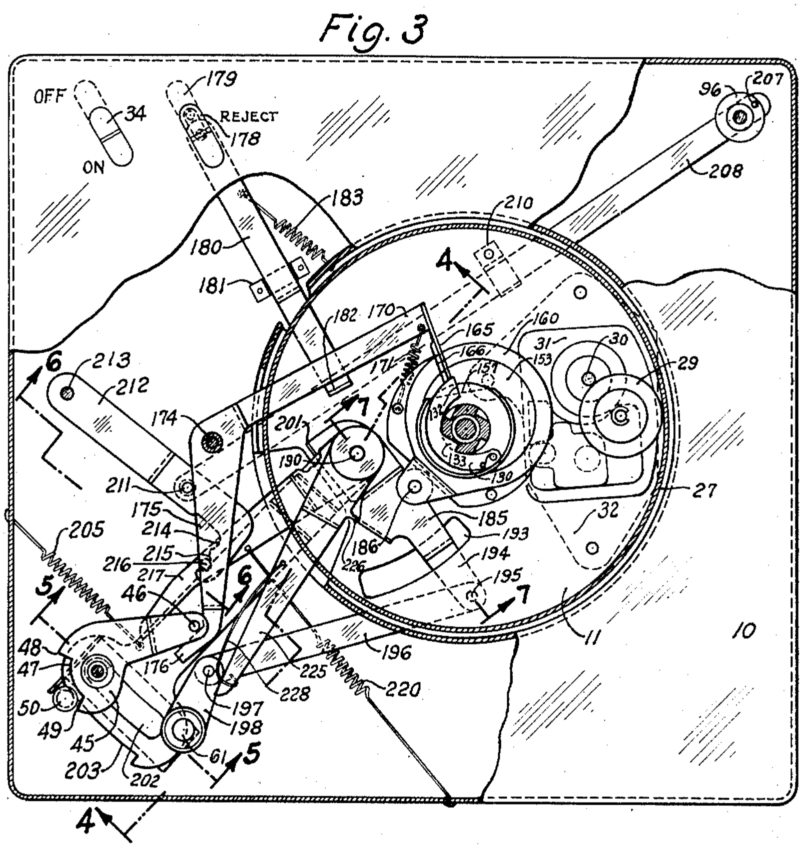
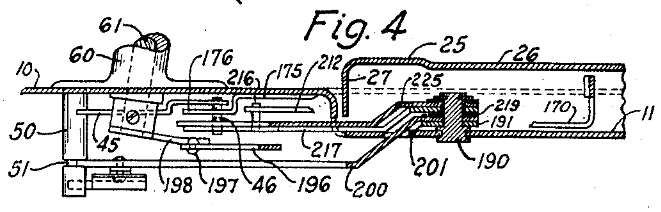
Fig. 5
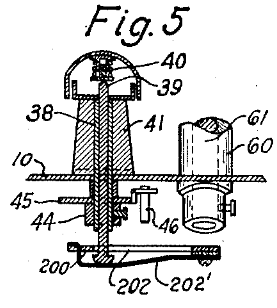
Fig. 6
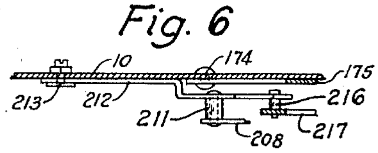
Fig. 7
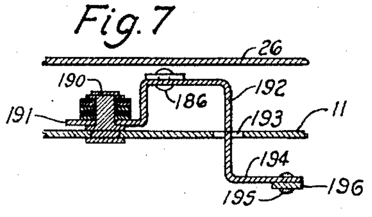
INVENTORS
ALBERT W. ALBRECHT, EDW. J. MASTNEY
ARTHUR C. TEN CATE.
BY Robert L. Kahn INVENTORS
ALBERT W. ALBRECHT, EDW. J. MASTNEY
ARTHUR C. TEN CATE
BY Robert L Kahn

RECORD CHANGER

Filed Nov. 14, 1947 4 Sheets-Sheet 4

INVENTORS
ALBERT W. ALBRECHT, EDW. J. MASTNEY
ARTHUR C. TEN CATE

BY Robert L Kahn

UNITED STATES PATENT OFFICE 2,558,474

RECORD CHANGER

Albert W. Albrecht, McHenry, Edward James Mastney, Berwyn, and Arthur C. Ten Cate, Downers Grove, Ill., assignors to Oak Mfg. Co., Chicago, Ill., a corporation of Illinois Application November 14, 1947, Serial No. 785,856

7 Claims. (Cl. 274—10)

This invention relates to an automatic record changer and provides a construction which is simple and efficient. While a large number of automatic changers have been designed and manufactured, they are all characterized by a large number and complexity of parts. This has resulted in substantial expense for tooling in connection with quantity production of such changers. In addition, the complexity of the changer has made it expensive to assemble and has given rise to difficulties in the field requiring frequent service. As a rule, most record changers have numerous adjustments therein which increase the cost of assembly and which are a fertile source of trouble when in use.

A construction embodying the present invention is characterized by simplicity and economy of parts. Such a construction is further characterized by the use of stampings which may readily be made sufficiently accurate in quantity production so that few, if any, adjustments are necessary in the changer as assembled.

The invention, in general, provides a motor drive on a turntable in accordance with usual practice. Associated with the turntable is a planetary drive which is normally inoperative but which may be tripped into driving engagement with the turntable. This planetary drive carries a plurality of cams which cooperate with suitable means to provide for the feeding of a record and operation of a tone arm as customary in record changers. The structure embodying the invention is of the type wherein a stack of records are stored above the turntable with a stationary bent spindle threading the central aperture in the records. Feeding of individual records is accomplished by proper action against the edge of the bottom record of a stack so that this bottom record may be free to drop on the turntable. In accordance with general practice, the changer is adapted to handle a stack of either ten or twelve-inch records.

Figure 1:
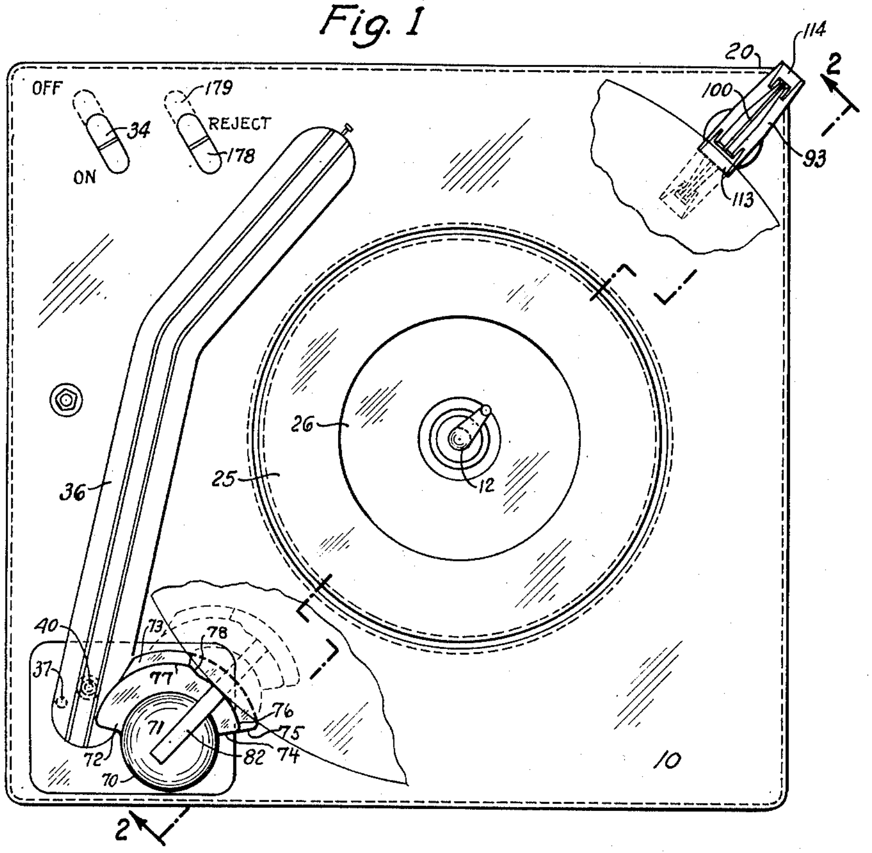
Figure 2:
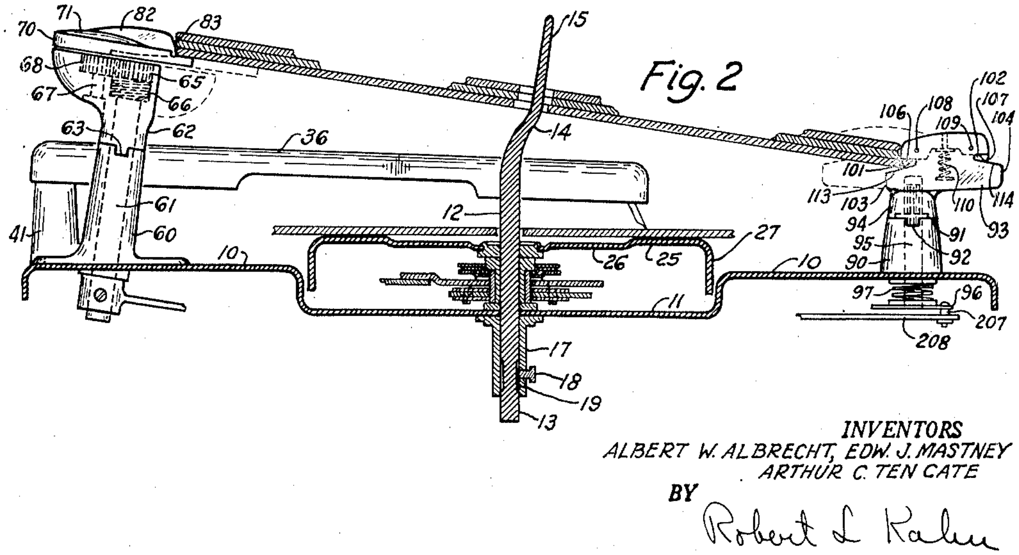
Figure 9:
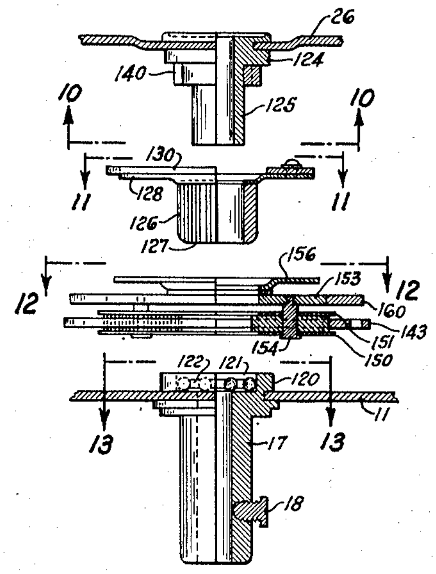
Figure 8:
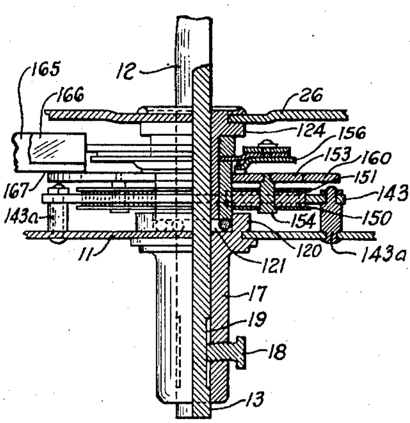
Figure 10:
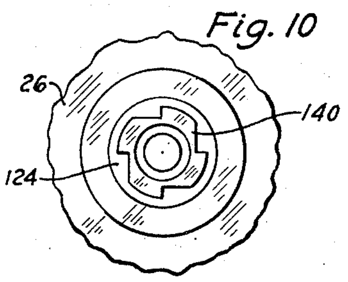
Figure 12:
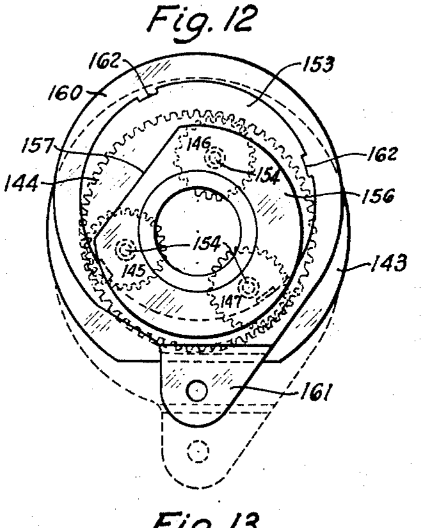
Figure 11:
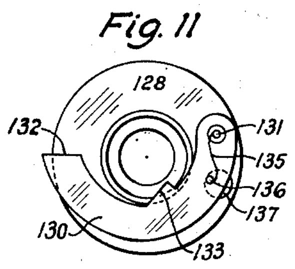
Figure 13:
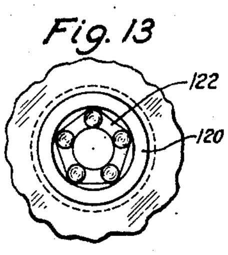
Figure 14:
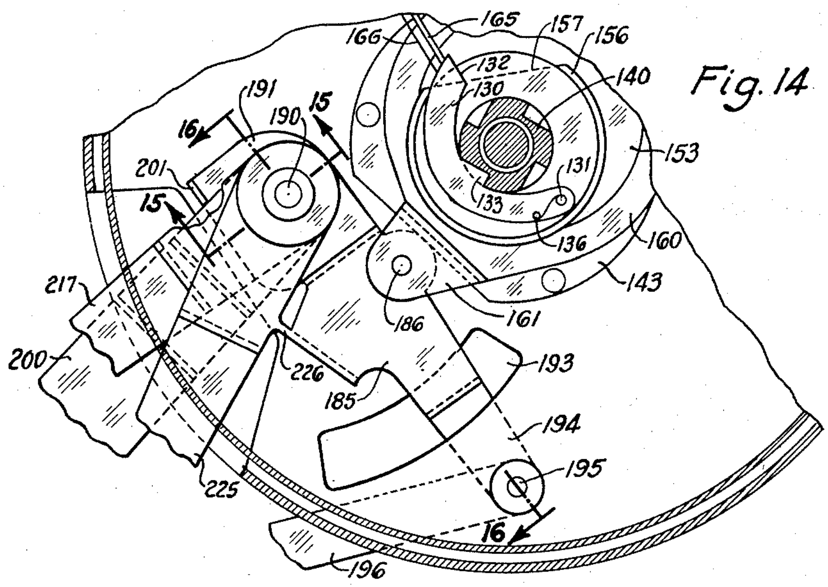
Figure 15:
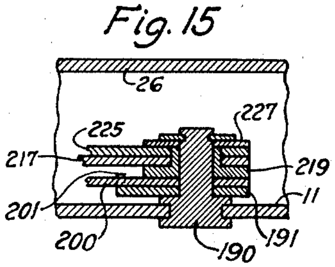
Figures 16, 18:
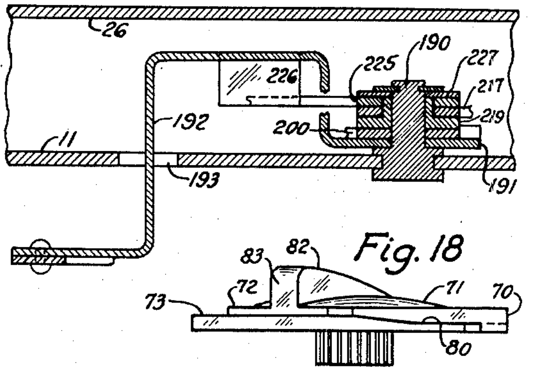
Figure 17:
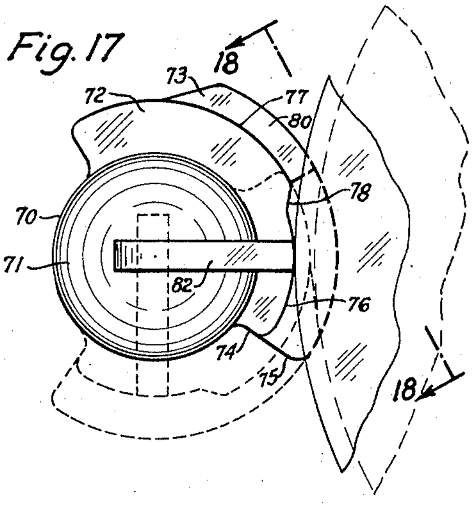
Figure 19:
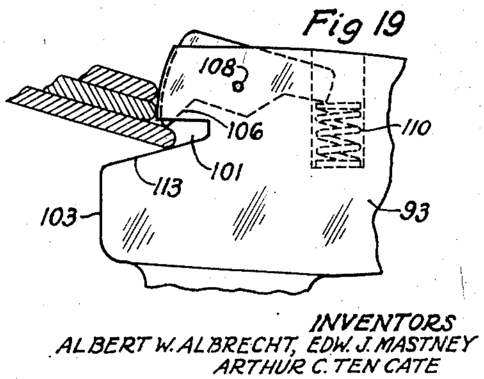

The invention is illustrated in connection with the drawings wherein Figure 1 is a top plan view of a record changer embodying the invention with the turntable partly broken away. Figure 2 is a sectional view on broken line 2—2 of Figure 1. Figure 3 is a plan view similar to Figure 1 with the baseboard and certain parts broken away and the mechanism shown as being tripped to initiate a changer cycle. Figure 4 is a section on line 4—4 of Figure 3. Figure 5 is a section on line 5—5 of Figure 3. Figure 6 is a sectional detail on line 6—6 of Figure 3. Figure 7 is a section on line 7—7 of Figure 3. Figure 8 is a partly sectional and partly elevation view of the planetary gear drive. Figure 9 is an exploded view of the parts making up the view of Figure 8, the spindle being omitted. Figure 10 is a sectional detail on line 10—10 of Figure 9. Figure 11 is a sectional view on line 11—11 of Figure 9. Figure 12 is a sectional view on line 12—12 of Figure 9. Figure 13 is a sectional view on line 13—13 of Figure 9. Figure 14 is an enlarged view of part of the mechanism shown in Figure 3 to show some details of the various parts pivoted at the king pin. Figure 15 is a sectional detail on line 15—15 of Figure 14. Figure 16 is a sectional detail on line 16—16 of Figure 14. Figure 17 is a plan view of the record feeding member in various positions to illustrate a record feeding cycle. Figure 18 is a side view of the record feeding member of Figure 17. Figure 19 is an enlarged detail of the bottom record engaging part.

The changer comprises baseboard or motor board 10 preferably of sheet steel or the like upon which the entire apparatus is mounted. Baseboard 10 may have any desired shape and, as shown here, is generally rectangular having circular well 11 in the central portion thereof. Centrally disposed in well 11 is spindle 12 having straight portion 13, the upper end of which has tapered bent portion 14 terminating in offset tip portion 15. Spindle 12 is stationary and is supported in sleeve 17 rigidly attached to well 11. Sleeve 17 has set screw 18 adapted to bear against flattened face 19 of portion 13 on the spindle. The spindle is mounted so that bent portion 14 extends toward corner 20 of the baseboard.

Turntable 25 has central portion 26 and depending flanged rim 27 adapted to fit within well 11. Turntable 25 is driven by rubber idler 29 normally adapted to be spring pressed against the inside surface of flanged rim 27. Idler 29 also bears against motor shaft 30 of motor 31. The motor is carried on plate 32 bolted to well 11. Idler 29 is spring pressed against motor shaft 30 and flange 27 in accordance with usual practice. Well 11 is cut away to provide clearance for the motor and driving elements.

Motor 31 is of the type used in phonograph work, preferably a shaded pole motor adapted to run at a predetermined constant speed. Suitable switching means controlled by button 34 are provided.

Tone arm 36 of any desired construction is provided. This tone arm is pivotally mounted at 37 for vertical movement. Pivots 37 are carried by rotatable sleeve 38 extending through a suitable aperture in baseboard 10. Disposed within sleeve 38 is pin 39 adapted to be moved vertically for elevating and dropping the tone arm. Pin 39 cooperates with screw 40 adjustably disposed in the tone arm for elevating the tone arm.

It is understood that the axis of pin 39 does not intersect the axis of pivot 37 and, in this instance, the axis of the pin is forward of pivot axis 37 so that elevation of pin 39 will result in elevation of the tone arm. Bushing 41 rigidly supported on baseboard 10 is provided for maintaining the tone arm in proper relation with respect to sleeve 38 and pin 39. Disposed around the bottom portion of sleeve 38 below baseboard 10 is bushing 44 rigidly keyed thereto. Bushing 44 carries actuating arm 45 having depending pin 46 at one end thereof nearest to well 11 and having arcuate portion 47 and ends 48 and 49 remote from the well. (Figure 3.)

Carried by the motor board is post 50 (Figure 4), this post being parallel and generally to the rear of pin 39. Post 50 is so disposed as to cooperate with arcuate portion 47. Ends 48 and 49 of the arcuate portion cooperate with the post to provide extreme limits for the rotary movement of sleeve 38. Post 50 adjacent the bottom end thereof is provided with annular slot 51 for a purpose that will be apparent later.

Disposed in the corner of the motor board adjacent the tone arm pivot is a rotary cam assembly for feeding records. Thus, motor board 10 carries journal portion 60 (Figure 2) within which is disposed pin 61 for rotary movement. The journal axis and pin are inclined from the vertical toward the spindle axis, this being the axis of straight portion 13. The angle of inclination may vary and, in practice, may be of the order of about ten degrees. Disposed above journal portion 60 is auxiliary journal portion 62. Portion 62 has projection 63 cooperating with a slot in journal portion 60 whereby auxiliary portion 62 may be located in either one of two positions, these positions being 180 degrees apart. Pin 61 extends up into auxiliary journal 62 and carries gear 65 at the upper end of the pin. Between gear 65 and a shoulder in journal portion 62 spring 66 is disposed around the pin to bias auxiliary portion 62 down against journal portion 60. Portion 62 carries pivot pin 67 parallel to but offset from pin 61. Pivot pin 67 has pinion 68 disposed therearound and meshing with gear 65. Pinion 68 and gear 65 have a one to one gear ratio. Thus, when portion 62 is turned 180 degrees with respect to part 60, it will be found that pinion 68 is turned 360 degrees with respect to its own axis. Figure 1 shows the two possible positions of this part for two record sizes, the dotted line position being for a 10 inch record.

Pinion 68 is rigidly attached to member 70, functioning as a combined record supporting and feeding member. Member 70 has central portion 71 and stepped ledges 72 and 73. Ledges 72 and 73 have coincident leading edges 74 and 75. The step between ledge 72 and ledge 73 is generally perpendicular to the planes of these ledges and forms two arcuate surfaces 76 and 77 joined by intermediate cam surface 78. The height of these surfaces is no greater than the thickness of a record. It will be noted that surface 77 has a greater radius than surface 76. The width of ledge 73 should be great enough to support the edge portion of a record while the angular extent of ledge 73 should be such that the trailing edge will clear a record when member 70 has been moved to its dotted position in Figure 17. The leading portion of ledge 72 bounded by surface 76 should be narrow enough so that the edge of a record may bear against the surface. The trailing portion of ledge 72 bounded by surface 77 should be wide enough so that this trailing portion may slide under the record above the bottom one and support the same. The angular extent of ledge 72 should be such that the trailing portion will still be under a record when member 70 is in its dotted position.

The step ledges are generally flat and lie in planes substantially perpendicular to the axis of pin 61. However, the trailing portion of the ledge has surface 80 dropping down toward the turntable (Figures 2 and 18). Trailing portion 80 of the lower ledge may be substantially flat and somewhat lower than the plane of the ledge proper.

Member 70 carries record retaining block 82, having active face 83 for bearing against the edge of a stack of records in position during the feeding action. In the normal position of member 70, record retaining part 82 has active face 83 opposed to spindle 12. Face 83 extends down and merges with surface 76 at any desired part thereof, the height of face 83 being equal to the thickness of a stack of at least three or four records. Additional records above the bottom three or four of a stack need not engage face 83.

Record feeding action is obtained by rocking member 70 clockwise as seen in Figures 1 and 17, so that the edge of a bottom record which normally engages surface 76 is engaged by cam surface 78. This causes the bottom record of a stack to be moved in its own plane toward spindle 12. Further turning movement of member 70 brings surface 77 into engagement with the edge of the bottom record to maintain the record in feeding position. Sloping surface 80 of lower ledge 73 aids in this feeding action. Records above the bottom are supported by the outer part of ledge 72. When member 70 reaches the dotted line position in Figure 17 the bottom record drops. Reverse movement of member 70 in counter-clockwise direction returns the same to its normal full line position as seen in Figure 17 for a new record feeding cycle. The means for accomplishing the above oscillation will be described in detail later. It is understood that the means engaging a diametrically opposed part of the bottom record, to be described later, aids in the record feeding action.

Disposed in corner 20 of the motorboard is a means for supporting the edge portion of the bottom record of a stack at a point on the record diametrically opposed to the region of support offered by record supporting member 70.

This means comprises sleeve 90 rigidly supported on motor board 10 in any suitable fashion. This sleeve has top face 91 having slot 92 therein. Resting on top face 91 is record supporting member generally designated by numeral 93 and having base portion 94. Base portion 94 has locks engaging slots 92 for rotatively locking the record supporting member in position. Record supporting member 93 has rigidly attached thereto pin 95 extending downwardly as seen in Figure 2, through sleeve 90, and below the motorboard. Pin 95 carries retaining disk 96 at the bottom end thereof, and has spring 97 around the pin between washer 96 and the bottom of the motorboard. It will be evident that spring 97 biases record retaining member 93 downwardly against sleeve 90.

Member 93 may be pulled vertically up against the bias due to spring 97 and be locked in one of two positions 180 degrees apart. In either of these positions, one being for 10-inch records and the other for 12-inch records, record supporting member 93 extends generally radially of the turntable. Record supporting member 93 comprises an elongated body having slot 100 along the top thereof. Record supporting member 93 also has record engaging slots 101 and 102 at the opposite ends of the body. These slots are somewhat larger than the thickness of a single record but less than two records. Member 93 has end faces 103 and 104 below record engaging slots 101 and 102, these faces extending substantially perpendicular to the motorboard. It will be noted that member 93 is mounted eccentrically with the axis of pin 95 being substantially closer to one of the slots than to the other. In this particular instance the axis of pin 95 is sufficiently close to slot 101 so as to pass through the same, this being unimportant in itself. Slot 101 is lower with respect to the motor board than record engaging slot 102. When member 93 is turned 180 degrees from the full line position to the dotted position shown in Figure 1, slot 102 will be in operative position and will be about one inch nearer to the axis of portion 15 of the spindle. Thus it will be evident that record supporting member 93 in the full line position may be used for 12-inch records while 10-inch records may be handled in the dotted position of the member.

Member 93 has fingers 106 and 107 pivotally mounted at 108 and 109 respectively for vertical movement in slot 100. Spring 110 acting on both fingers normally biases the fingers so that the tips bear against shoulders 113 and 114 of the record engaging slots. These fingers are so shaped as seen in the drawing as to move upwardly to clear a record engaging slot upon edgewise movement of a record into the slot. This permits only the bottom record to slide into dropping position, to clear ledge 73 and slide down the spindle and away from the slot and drop into playing position.

The means for moving the record feeding means and tone arm previously described are now set forth. Referring to Figures 8 to 13 inclusive, sleeve 17 has portion 120 thereof disposed above the well wall. Portion 120 is finished to provide recess 121 into which is disposed ball bearing retainer 122, carrying a number of ball bearings. Immediately disposed around straight portion 13 of the spindle is sleeve 124 rigidly carried by turntable 26, sleeve 124 being normally adapted to rotate around spindle 12 during operation. Sleeve 124 has portion 125 extending downwardly and terminating just above ball bearing 122. Disposed around the outside of portion 125 is sun gear 126, having bottom face 127 riding on the ball bearings. Sun gear 126 carries plate 128 at the top thereof upon which plate is mounted curved detent arm 130, pivoted at 131 and having free end 132. Detent arm 130 has tooth 133 extending inwardly therefrom. Detent arm 130 is biased to an inward position by spring 135 acting on pin 136. The range of travel of arm 130 around pivot pin 131 is determined by pin 136 extending into aperture 137 in plate 128.

Ratchet wheel 140 is rigidly carried by sleeve 124 at the upper portion of part 125 thereof. As indicated in Figure 10, ratchet wheel 140 has a number of teeth, here shown as four, although the number could be increased or decreased as desired. These teeth are shaped to engage in one direction of movement with respect to tooth 133. The travel of arm 130 with respect to plate 128 is so adjusted that its inwardly biased position as shown in Figure 11 is such as to dispose tooth 133 in engaging position with the teeth of ratchet wheel 140. It might be stated that normally arm 130 is maintained in its outward position against its spring bias so that tooth 133 does not engage ratchet wheel 140, in this position the turntable rotating freely and no cycling occurring.

Disposed between plate 128 and the bottom of well 11 is a planetary gear assembly shown in Figure 12. This assembly comprises mounting plate 143 having ring gear 144. Mounting plate 143 is rigidly supported on well 11 by posts 143*a*. Engaging ring gear 144 are a plurality of planetary gears, here shown as three, 145 to 147 inclusive. These planetary gears rotate around pivot pins 154 between cover plates 150 and 151 on opposite sides of mounting plate 143. Disposed above plate 151 as seen in Figures 8 and 9 is eccentric plate 153. This may comprise a circular plate eccentrically mounted with respect to the planetary gear assembly. Eccentric plate 153 is rotatively locked to the planetary gear assembly by any suitable means, such as pins 154. If desired, eccentric plate 153 may be made integral with cover plate 151. Disposed above eccentric plate 153, as seen in Figures 8 and 9, and rigidly attached thereto is cycling cam plate 156, which may be generally circular except for a portion cut out to leave generally straight edge 157.

Disposed around eccentric plate 153 is eccentric ring 160 provided with tail piece 161. It is preferred to provide retaining ears 162 on eccentric ring 160 to engage the top face of eccentric plate 153 adjacent the edge to prevent the ring from dropping down out of position as seen in Figures 8 and 9, for example. Cycling cam plate 156 may be relied upon for limiting the upward movement of the ring in case the changer happens to be turned upside down.

Under normal conditions when the turntable is rotating and no changer operation is desired, suitable means engaging free end 132 of detent arm 130 maintains this arm in an outer position so that tooth 133 will not engage ratchet wheel 140. In this outward position, the entire planetary gear assembly is at rest. Upon initiation of a changer cycle, a finger, to be described later, clears free end 132 of arm 130 and permits this arm to move inwardly, as seen in Figure 11, in response to its spring bias. Rotation of the turntable and ratchet wheel 140 brings tooth 133 into engagement with one of the teeth of 140. Thus a driving connection is established between ratchet wheel 140 and plate 128. This turns sun gear 126 in a clockwise direction looking down upon the changer. Rotation of sun gear 126 causes rotation of planetary gears 145 to 147 inclusive. These planetary gears engage ring gear 144 on stationary plate 143 and, as a result, force the planetary gear assembly and eccentric 153 to rotate in a clockwise direction.

Eccentric 153 actuating eccentric ring 160 is a means for causing the changer operation proper. The full line position of the parts in Figure 12 shows them in a normal rest position. When cycling occurs, the parts move to the dotted line position and return to their full line normal position. Cycling cam 156, once it starts to turn, serves to maintain the driving connection between detent arm 130 and ratchet wheel 140 until a complete operating cycle occurs. The ratio between sun gear 126 and planetary gears 145 to 147 inclusive will determine the number of turns plate 128 must make for a complete changer cycle. At the beginning of a changer cycle, free end 132 of detent arm 130 overlies straight portion 157 of cam 156. Once the mechanism starts to operate for a changer cycle, plate 128 turns, with respect to cam 156, in a clockwise direction. After a number of turns of plate 128, cam plate 156 and plate 128 again assume the starting position so that free end 132 overlies straight portion 157 of the cam. This signals the end of a changer cycle.

Cooperating with free end 132 of detent arm 130 is finger 165 and auxiliary spring finger 166. As seen in Figure 3, spring finger 166 is in advance of finger 165 with respect to clockwise rotation of the turntable looking down upon the changer. The spring finger is provided to kick detent 132 clear of ratchet 140 when cycling stops. Finger 165 has portion 167 riding on the top surface of cam 153 to steady the finger. Fingers 165 and 166 are carried by arm 170 and are biased inwardly toward the spindle by spring 171 extending between a pin on arm 170 and a pin on stationary plate 143. Arm 170 is pivoted at 174 by a pin carried by the motor board and extending below the same. Arm 170 is part of a bell crank lever whose other arm 175 terminates in bent feeler 176. Bent feeler 176 is adapted to be engaged by pin 46 carried by member 45. The relative disposition of feeler 176 with respect to the normal position of pin 46 is such that when the tone arm reached a predetermined minimum distance from the spindle or center of the record, pin 46 will engage feeler 176 and rock the bell crank. This will result in fingers 165 and 166 being moved outwardly to clear detent 130 and initiate a changer cycle.

A changer cycle may be initiated at any time, irrespective of the tone arm position, by reject button 178 operating in slot 179 in the motor board and attached to arm 180. Arm 180 is maintained in position underneath the motor board by strap 181 riveted to the motor board and bent around arm 180. Arm 180 has bent end 182 extending around arm 170. Upon movement of reject button 178 outwardly to the edge of the motor board, bent end 182 will engage arm 170 and move the bell crank out. Reject arm 180 is normally maintained in an idle position by spring 183 extending between a pin on arm 180 and a suitable pin on the motor board.

Referring now to eccentric ring 160, tail piece 161 is connected to arm 185 by pivot 186. Arm 185 is pivoted at well 11 by king pivot pin 190. As is evident in Figures 7 and 16, arm 185 is bent so that portion 191 at the king pivot pin is disposed opposite to top face of well 11. The arm then extends upwardly and downwardly to form generally shaped U-shaped portion 192 where rivet 186 is disposed. Portion 192 of the arm extends through aperture 193 in well 11 (Figures 7, 14 and 16) and emerges below the motor board. Portion 194 of arm 185 is pivotally secured at 195 to lever 196 which, in turn, is pivotally secured at 197 to crank 198 rigidly attached to pin 61 (Figure 4).

Pivoted at king pivot pin 190 above portion 191 is arm 200. This arm is moved by ear 201 (Figure 3) extending up from portion 191 and disposed on one side of arm 200. Arm 200 is bent downwardly to pass through a slot in well 11 and flares to provide slotted portion 202. Slotted portion 202 carried cam 202′ of the shape shown in Figure 5. This cam is so shaped that upon movement of slotted portion 202 clockwise as seen in Figure 3, cam 202′ is moved to the left as seen in Figure 5 and thus forces pin 39 upwardly for elevating the tone arm.

Beyond slotted portion 202 is guiding edge 203 adapted to ride in slot 51 of pin 50 (Figure 4). Guide 203 has suitable stop means at the two ends to limit the angular travel of the slotted portion. Arm 200 has attached thereto, at a suitable spot, spring 205 extending between it and the side of the motor board, this spring tending to maintain the arm so that it bears against gear 201.

In order to adapt a changer for selective operation on 10 or 12 inch records, disk 96 (Figures 2 and 3) has crank pin 207 to which is pivotally attached lever 208. Lever 208 is slidably retained against the bottom of well 11 by strap 210. Lever 208 is pivoted at 211 to arm 212 pivotally secured below the motor board at 213. Lever 212 has its free end portion shaped as a finger to provide two spaced rests 214 and 215 respectively. Cooperating with these rests is pin 216 (Figure 6), carried by arm 217. Arm 217 extends through a slot in well 11 and is bent to provide a portion for pivotally mounting on king pivot pin 190. Collar bushing 219 between arm 200 and 217 is provided to permit relative movement of the arms.

Arm 217 has its free end in the path of travel of pin 46 and is free to move around king pivot pin 190. However, arm 217 is biased by spring 220 extending between a portion of the motor board and the lever arm. Pivoted at king pin 190 and above arm 217 is arm 225 rigidly joined to arm 185 by ear 226 extending between the two. Arm 225 carried spring 228 extending to one side of the arm toward pin 46. Washer 227 above arm 225 is provided to maintain the arms in assembled position. The pivot pin may be removably secured to the baseboard in any suitable manner.

Arm 225 is normally adapted to be in the position shown in Figure 3. When the changer begins to cycle, this arm moves clockwise around king pin 190. At the same time, the tone arm is elevated by cam 202′. As arm 225 moves clockwise, spring 228 approaches pin 46 and after reaching the pin spring 228 will be bent back. This will occur because of the effect of spring 220 upon arm 217. When arm 225 actually touches pin 46 and pin 46 bears against arm 217, the tone arm will be at the outer groove of the record. Further movement of arm 225 in a clockwise direction results in pin 46 being moved still further and arm 217 being moved in a clockwise direction against the bias of spring 220. This will cause pin 216 to clear rest 215. The movement of arm 217 in a clockwise direction will correspond to the movement of the tone arm beyond the edge of the record and in general will be sufficient to permit the tone arm to clear any record dropping down upon the turntable.

When arm 225 starts to reverse and moves counter-clockwise back toward the position shown in Figure 3, the tone arm will be moved back toward the record edge. As long as pin 46 is caught between arm 225 and arm 217, the tone arm will be beyond the outer groove of the record. During return movement of arm 225, spring 220 moves arm 217 so that this arm tends to follow pin 46. However, when arm 217 reaches the position shown in Figure 3 so that pin 216 is caught by finger rest 215 then the following action occurs. Arm 217 remains stationary in the position shown in Figure 3. As arm 225 retreats counter-clockwise, spring 228 is released while bearing against pin 46. Inasmuch as the load for tone arm movement is small, spring 228 bearing against pin 46 will keep the tone arm stationary for a short time in spite of the retreat of arm 225. In this position of the tone arm, the needle is above the outer groove of the record and during the time that the tone arm is thus poised in position, cam 202′ drops the tone arm until the needle engages the record. Thereafter arm 225 continues to retreat and leaves pin 46 clear as shown in Figure 3.

In the event that a different size record is to be played, turning of record engaging part 93 will move arm 212 and dispose rest 214 in the path of travel of pin 216.

The operation of the entire record changer will be briefly reviewed. Assuming that motor 30 is energized turntable 26 will revolve in a clockwise direction as seen in Figures 1 and 3. Let it be assumed that reject button 178 has just been moved to initiate a changer cycle. The movement of reject button 178 will rock arm 170 on pivot 174. Fingers 165 and 166 will thereupon be moved clear of detent 130. The mechanism will then be in the condition shown in Figure 3. This will permit detent 130 to move inwardly to the full line position shown in Figure 11. In this position, a driving engagement between plate 128 and ratchet wheel 140 will occur. As previously described, this driving engagement will result in rotation of eccentric 153 in a clockwise direction as seen in Figure 12. Rotation of eccentric 153 will cause ring 160 to be moved from the full line position to the dotted line position shown in Figure 12 and back again to the full line position.

Oscillation of ring member 160 will result in an oscillation of arm 185 around king pin 190. Referring to Figure 3, when arm 185 is initially moved away from the center of the turntable, lever 196 is moved down toward arm 45. This results in movement of arm 198 counter-clockwise with respect to pin 61. This moves record feed member 70 clockwise to begin a record feed cycle.

At the same time the initial movement of arm 185 releases arm 200 to move in a clockwise direction. This results in cam 202′ moving to the left as seen in Figure 5 and begin elevating the tone arm.

The initial movement of arm 185 also moves arm 225 in a clockwise direction and as pointed out previously results in turning the tone arm outwardly away from the center of the record. Upon return movement of ring 160, arm 185 moves back toward the center of the turntable. This causes record selecting member 70 to move in a counter-clockwise direction back to its original position, the bottom record in the stack having been dropped. As arm 200 returns to its initial position, arm 225 is returning to its position to dispose the tone arm so that the needle is poised above the edge of a record. It is understood that the timing is so arranged that the tone arm reaches its position above the edge of a record before the tone arm is permitted to drop into playing position.

When a complete changer cycle has occurred, fingers 165 and 166 will be disposed at flat portion 157 and detent 130 will also come around so that the end of the detent is above flat portion 157. When this occurs, fingers 165 and 166 will move inwardly in response to the bias of spring 171 and move the detent outwardly to a position where tooth 133 is clear of ratchet wheel 140.

When the needle reached a center portion of the record, pin 46 will bear against finger portion 176 and cause fingers 165 and 166 to be released from detent 130. It is evident that this type of a release depends upon the fact that the tone arm needle reaches a predetermined inner position and is not dependent upon rocking of the tone arm back and forth by the inner eccentric grooves usually provided in records.

What is claimed is:

1. An automatic record changer comprising a motor board, a record spindle supported on said board, a turntable supported on said board with the axis of the turntable coincident with the spindle axis, a motor drive for said turntable, a sun gear surrounding said spindle and freely rotatable with respect thereto, a ratchet wheel carried on said turntable, a pawl carried by said sun gear, spring means for biasing said pawl to a ratchet wheel engaging position, locking means operative to maintain said pawl against its bias free of said ratchet wheel when said changer is not cycling, means for disabling said locking means to initiate and maintain a changer cycle, at least one planetary gear meshing with said sun gear and movable around the sun gear axis, a plate coupled to said planetary gear and movable with the axis of said planetary gear around the sun gear axis, a stationary ring gear meshing with said planetary gear, said plate including a cam surface normally having a predetermined orientation with respect to the pawl when said changer is at rest, said locking means also engaging said cam surface on said plate when said changer is idle, said plate and sun gear revolving around the sun gear axis during changer movement at different rates, said plate being adapted to rotate with said planetary gear axis during changer operation, and means for feeding a record from a stack to said turntable from said plate movements during a changer-cycle, whereby after a changer cycle has been initiated, said changer cycle is determined by said pawl and cam surface of said plate again reaching a predetermined orientation.

2. An automatic record changer comprising a motor board, a record spindle supported on said board, a turntable supported on said board coaxially with said spindle, a motor drive for said turntable, a sun gear coaxial with said turntable, but rotatable with respect thereto, a ratchet wheel carried by said turntable, a pawl carried by said sun gear, means for biasing said pawl to a ratchet engaging position, a tone arm, locking means for maintaining said pawl in a disengaged position against its bias, means controlled by said tone arm for disabling said disengaging means to initiate a changer cycle, a planetary gear meshing with said sun gear and movable around the same, an eccentric secured to said planetary gear and movable with said gear axis around the sun gear axis, a stationary ring gear meshing with said planetary gear, an eccentric ring for said eccentric, said eccentric having a cam with a cam surface normally aligned with a portion of said pawl when said changer is idle, said locking means also engaging said cam surface on said cam plate when said changer is idle, said cam surface and pawl portion having a differential rotation around said turntable axis during changer operation, said cam surface and pawl portion determining a changer cycle while they are out of coincidence and means for feeding a record from a stack to said turntable by movement derived from said eccentric ring.

3. An automatic record changer comprising a motor board, a stationary record spindle mounted on said board, two record engaging portions mounted at diametrically opposite points on said board beyond said turntable, said spindle having a portion offset away from one record engaging portion toward the other record engaging portion, said one record engaging portion comprising the following: a pair of generally horizontal stepped annular ledges, the lower ledge being nearer the spindle and having a generally arcuate outer edge, the upper ledge having the leading portion thereof narrow and the remaining portion wider with an intermediate tapering portion, the step between the two ledges being generally perpendicular to the ledges and less than the thickness of a record, means for mounting said one portion to oscillate about a generally vertical axis during cycling with the ledges being generally horizontal, said one portion normally being in a position so that the bottom record of a stack rests upon the leading portion of the lower ledge with the edge of the bottom record bearing against the leading part of the step, said bottom record being adapted to be moved toward the spindle by the step when said one portion begins to turn in one direction with said bottom ledge dropping said record while the wider portion of the upper ledge slides under the record above the bottom; said other record engaging portion comprising a member having a generally horizontal notch into which the edge of the bottom record only may enter, said member having a generally vertical notch and a spring pressed finger in said vertical notch bearing down and tending to close said horizontal notch but being adapted to be lifted against its bias by the edge of said entering record, said horizontal notch being enough to accommodate comfortably the thickness of a single record.

4. The changer according to claim 3 wherein said two record engaging portions have mounting means for bringing them closer to said spindle whereby 12 or 10 inch records respectively may be accommodated.

5. The changer according to claim 3 wherein said one record engaging portion is provided with eccentric mounting means to permit said one record engaging portion to be turned 360 degrees to bring the same nearer to or further from said spindle for 12 or 10 inch records respectively and wherein said other record engaging portion comprises an eccentrically mounted member, said member having the slots and fingers on two sides thereof and being adapted to present one or the other side toward said spindle to accommodate 12 or 10 inch records.

6. The changer according to claim 3 wherein a planetary gear drive is provided between said motor board and said one record engaging portion for oscillating the latter.

7. The changer according to claim 3 wherein a planetary gear assembly is provided around said spindle, said planetary gear assembly having a power drive from said turntable, an eccentric operated by said planetary gear drive and means for oscillating said one record engaging portion from said eccentric.

ALBERT W. ALBRECHT.
EDWARD JAMES MASTNEY.
ARTHUR C. TEN CATE.

REFERENCES CITED

The following references are of record in the file of this patent:

UNITED STATES PATENTS

| Number | Name | Date |
|---|---|---|
| 1,228,145 | Sundh | May 29, 1917 |
| 2,062,396 | Corson | Dec. 1, 1936 |
| 2,270,415 | Catucci | Jan. 20, 1942 |
| 2,299,633 | Knox et al. | Oct. 20, 1942 |

FOREIGN PATENTS

| Number | Country | Date |
|---|---|---|
| 69,805 | Norway | Dec. 10, 1945 |